(12) United States Patent
Bertz et al.

(10) Patent No.: US 9,641,646 B1
(45) Date of Patent: May 2, 2017

(54) DISTRIBUTED MULTIMEDIA SYSTEM FOR IP NETWORKS

(71) Applicant: Sprint Communications Company L.P., Overland Park, KS (US)

(72) Inventors: Lyle Bertz, Lee's Summit, MO (US); John Belser, Olathe, KS (US); William Parsel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 14/254,402

(22) Filed: Apr. 16, 2014

Related U.S. Application Data

(63) Continuation of application No. 11/466,513, filed on Aug. 23, 2006, now Pat. No. 8,750,336.

(51) Int. Cl.
*H04J 3/04* (2006.01)
*H04L 29/06* (2006.01)

(52) U.S. Cl.
CPC .................. *H04L 67/42* (2013.01)

(58) Field of Classification Search
CPC ............................................... H04Q 2213/036
See application file for complete search history.

(56) References Cited

U.S. PATENT DOCUMENTS

| | | | |
|---|---|---|---|
| 6,044,265 A | 3/2000 | Roach, Jr. | |
| 7,430,284 B2 | 9/2008 | Dudley et al. | |
| 2002/0028672 A1* | 3/2002 | Qi | H04M 3/487 455/414.3 |
| 2004/0258063 A1 | 12/2004 | Raith et al. | |
| 2005/0038892 A1* | 2/2005 | Huang et al. | 709/227 |
| 2005/0108334 A1 | 5/2005 | Tam et al. | |
| 2005/0198274 A1* | 9/2005 | Day | 709/224 |
| 2006/0029192 A1* | 2/2006 | Duddley et al. | 379/88.13 |
| 2008/0026778 A1* | 1/2008 | Cai et al. | 455/466 |
| 2008/0043763 A1 | 2/2008 | Johnson et al. | |
| 2009/0019149 A1 | 1/2009 | Cohen et al. | |

OTHER PUBLICATIONS

Notice of Allownace mailed Jan. 30, 2014 in U.S. Appl. No. 11/466,513.
Non Final OA mailed Jan. 7, 2009 in U.S. Appl. No. 11/466,513.
Final OA mailed Jun. 24, 2009 in U.S. Appl. No. 11/466,513.
Non Final OA mailed Dec. 23, 2009 in U.S. Appl. No. 11/466,513.
Non Final OA mailed Jun. 7, 2010 in U.S. Appl. No. 11/466,513.
Final OA mailed Nov. 23, 2010—in U.S. Appl. No. 11/466,513.
Non Final OA mailed Jul. 11, 2011 in U.S. Appl. No. 11/466,513.
Final OA mailed Feb. 27, 2012—in U.S. Appl. No. 11/466,513.
Advisory Action mailed May 1, 2012 in U.S. Appl. No. 11/466,513.
Non Final OA mailed Sep. 19, 2012 in U.S. Appl. No. 11/466,513.
Final OA mailed May 7, 2013 in U.S. Appl. No. 11/466,513.

\* cited by examiner

*Primary Examiner* — Samina Choudhry

(57) ABSTRACT

A method, system, and computer-readable media are provided for facilitating communication of multimedia data across a distributed network. When the invention is employed for facilitating intra-communication between mobile network carriers, the invention can be configured to utilize a plurality of distribution sites. A first distribution site of a sender can receive an item of multimedia data and an identifier from a sender. The first distribution site may then transmit the identifier to a look-up server in order for the look-up server to identify the location of a recipient's distribution site. Once the look-up server identifies the recipient's distribution site for the first distribution site, the first distribution site can transmit the multimedia data to the recipient's distribution site.

7 Claims, 4 Drawing Sheets

DISTRIBUTED MULTIMEDIA SYSTEM FOR IP NETWORKS

PRIORITY

This application is a continuation of U.S. Ser. No. 11/466,513, entitled "Distributed Multimedia System for IP Networks," filed 23 Aug. 2006, which is hereby incorporated by reference in its entirety.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

It has become a growing trend for people to send a variety of different types of multimedia content to one another through the use of the Internet. Users of mobile devices, such as cellular phones, are increasingly sending multimedia data to other users of mobile devices. Such multimedia data may include, for example, voice messages, text messages, both motion and still video content, and music content. With the growing number of mobile network subscribers, the processing of such multimedia data has become an ever increasing challenge.

Conventionally, mobile network service carriers process multimedia data transmitted by their subscribers at one centralized location. However, this may require constant maintenance and a large amount facilities in terms of floor space, power and cooling at these sites. There is a need to have a true multimedia platform or an integrated multimedia platform that is distributable. Current standards do not provide a way in which carriers can distribute themselves to multiple sites for their own needs.

SUMMARY

The present invention is defined by the claims below. Embodiments of the present invention solve at least the above problems by providing a system, method, and computer-readable media for, among other things, facilitating communication of multimedia data across a distributed network.

In a first aspect, a method for facilitating intra-communication of multimedia data within a carrier across a distributed network may comprise receiving at least one item of multimedia data and an identifier at a first distribution site. In such a method, the first distribution site may be associated with a sender and the identifier may be associated with a recipient. The at least one item of multimedia data and the identifier may be received using a first interface. The method can further comprise transmitting the identifier to a look-up server, wherein the identifier may be transmitted using a second interface. Moreover, the method can comprise receiving a reference to the location of a second distribution site from the look-up server, wherein the second distribution site may be associated with the identifier. Additionally, the method can comprise transmitting the multimedia data to the second distribution site.

In another aspect, a system for facilitating intra-communication of multimedia data within a carrier across a distributed network may comprise a first distribution site for receiving at least one item of multimedia data and an identifier. The first distribution site may be associated with a sender and the identifier may be associated with a recipient. Additionally, the at least one item of multimedia data and the identifier may be received using a first interface. The system may further comprise a look-up server for receiving the identifier and using the identifier to determine a location of a distribution site for the recipient. The identifier may be received using a second interface. Moreover, the system may comprise a second distribution site for receiving the at least one item of multimedia data from the first distribution site and for transmitting the at least one item of multimedia data to the recipient.

In yet another aspect, the invention discloses one or more tangible computer-readable media having computer-useable instructions embodied thereon for performing a method for facilitating communication of multimedia data across a distributed network, wherein the method may comprise receiving at least one item of multimedia data and an identifier at a first distribution site. In such a method, the first distribution site may be associated with a sender and the identifier may be associated with a recipient. The at least one item of multimedia data and the identifier may be received using a first interface. The method can further comprise transmitting the identifier to a look-up server, wherein the identifier may be transmitted using a second interface. Moreover, the method can comprise receiving a reference to the location of a second distribution site from the look-up server, wherein the second distribution site may be associated with the identifier. Additionally, the method can comprise transmitting the multimedia data to the second distribution site.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
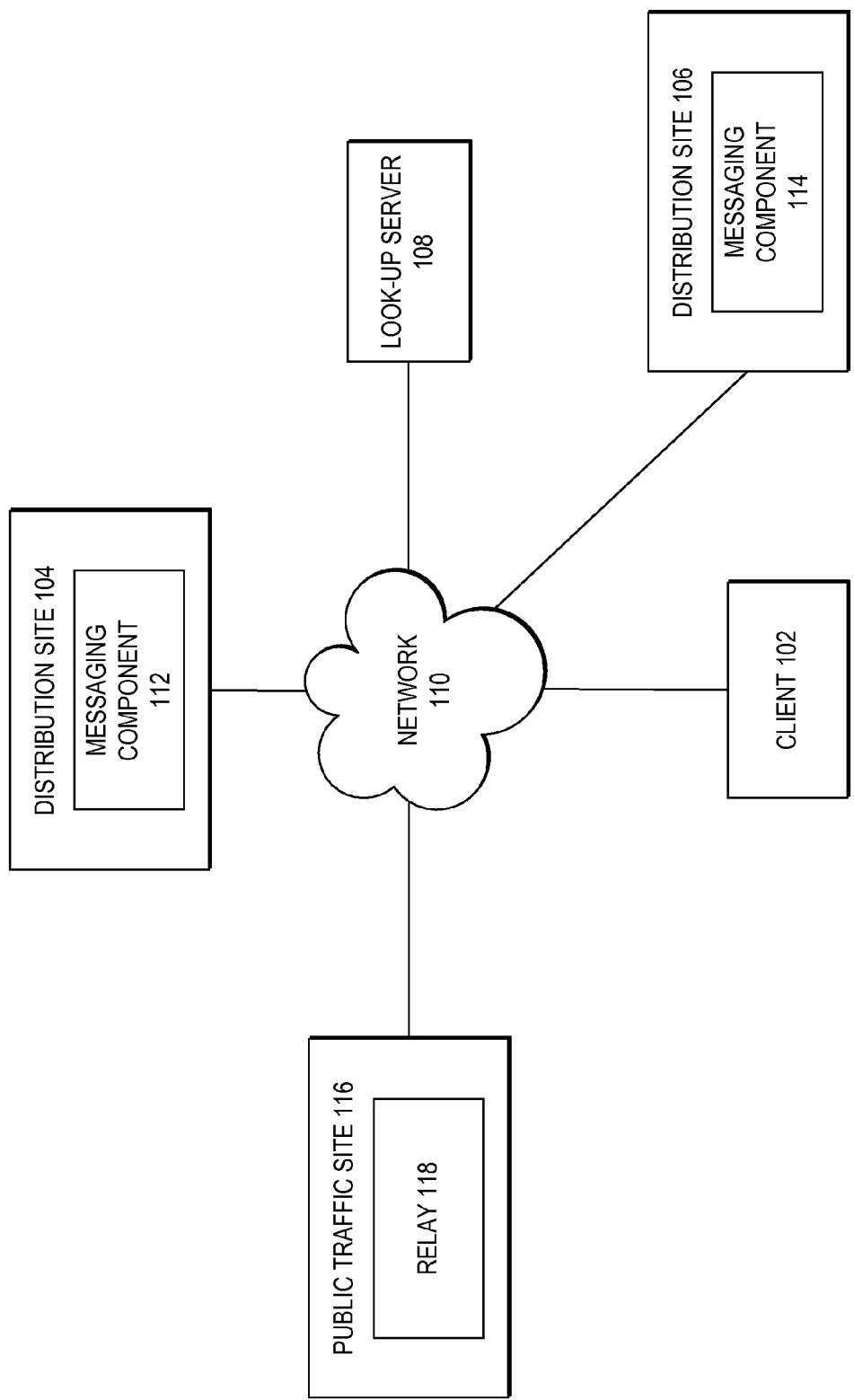
FIG. 1 illustrates an embodiment of a system for implementing the invention.

Embodiments of the present invention provide systems and methods for performing a method for facilitating communication of multimedia data across a distributed network. The present invention provides the ability to consolidate multimedia functions at multiple sites and for them to scale to a greater size than prior art. The present invention may be IP based and can support legacy TDM transport as required. The ability to distribute increases the availability and scalability of the invention while allowing for a consumer to be served by numerous applications at a single site. This can have the benefit of providing lower latency and may require less resources in terms of common application elements like Group Lists, Contact (Address Book) and Content. These solutions may support both landline and wireless devices with complete support for intra and inter-carrier communications.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| MM | Multimedia message |
| MMS | Multimedia service |
| MMSC | (Multimedia Messaging Service Center) MMSC can be a store-and-forward method of transmitting graphics, video clips, sound files and short text messages over wireless networks using, for example, the WAP protocol. Carriers may deploy servers, MMSCs, to implement the offerings on their systems. MMS may also support e-mail addressing, so the device can send e-mails directly to an e-mail address. A common use of MMS is for communication between mobile phones. |
| DNS | (Domain Name System) DNS may be a mechanism used in the Internet and on private Intranets for translating names of host computers into addresses. When using a domain name, a DNS service can translate the name into the corresponding IP address. For example, the domain name www.example.com may translate to 198.105.232.4 |
| ENUM | (Electronic Numbering - RFC 2916) ENUM is the Internet Engineering Task Force (IETF) protocol that can assist in the convergence of the Public Switched Telephone Network (PSTN) and the IP network; it is the mapping of a telephone number from the PSTN to Internet services - a telephone number can be inputted, and an URL can be outputted. ENUM was developed as a solution to the question of how to find services on the Internet using only a telephone number, and how telephones, which have an input mechanism limited to twelve keys on a keypad, can be used to access Internet services. |
| ESMTP | (Enhanced Simple Mail Transfer Protocol) ESMTP specifies extensions to the original protocol for sending e-mail that supports graphics, audio and video files, and text in various national languages. The original Internet protocols for sending e-mail are described in Request for Comments (RFC) 822, Standard for the Format of ARPA Internet Text Messages, and in RFC 821, Simple Mail Transfer Protocol (SMTP). As users began to want to attach various kinds of files to e-mail, the need for additional capabilities arose and resulted in RFC 1869, Extended Simple Mail Transfer Protocol. ESMTP provides the capability for a client e-mail program to ask a server e-mail program which capabilities it supports and then communicate accordingly. Currently, a lot of commercial e-mail servers and clients support ESMTP. |
| IMP | (IP Messaging Platform) IMP is a non/near-real time, IP-based, message delivery system allowing subscribers to view, edit, send, respond to, and receive messages which may include one or more objects of various types. Defined objects include text, images, video, audio, music, files or applications. The IMP components which make up the supporting platforms, sub-platforms, and supporting elements (to include third party vendors) that support the defined product set consisting of Mail (Email & Short Mail), Picture/Video Mail, |

-continued

| | |
|---|---|
| | Text Messaging (SMS & Short Codes), Instant Messaging, Chat, Business Connection, Blackberry, PTT services, and Voice Mail. |
| MM1 | The MM1 interface allows interactions between the MMS client in the device and the MMSC. 3GPP2 has defined the functional requirements of this interface. |
| MM2 | The MM2 interface is the interface between two internal elements composing the MMSC: the MMS server and relay. Most commercial solutions offer a combined relay and server in the form of an MMSC. Consequently, the interface between the relay and server is developed in a proprietary fashion. |
| MM3 | The MM3 interface is the interface between the MMSC and external servers. Transactions invoked over this interface allow exchange of messages between the MMSCs and external servers such as e-mail or SMSC. This interface is typically based on IP-based e-mail protocols. |
| MM4 | The MM4 interface is the interface bridging two MMSCs. The interface is used to exchange multimedia messages between distinct mobile network environments. Transactions invoked over this interface are carried out over the Simple Mail Transfer Protocol (SMTP). |
| MM5 | The MM5 interface enables interactions between the MMS and other network elements like the Home Location Register (HLR) or Domain Name Server (DNS). |
| MM6 | The MM6 interface allows interactions between the MMSC and user databases (e.g. LDAP). This interface has not been standardized. |
| MM7 | The MM7 interface fits between the MMSC and Value-Added Service (VAS) applications. This interface allows a VAS application to request services from the MMSC (message submission, etc.) and to obtain messages from remote MMS clients. |
| MM8 | The MM8 interface enables interactions between the MMSC and a post-processing billing system. This interface hasn't been standardized. |
| MM9 | The MM9 interface enables interactions between the MMSC and an online charging system. With this interface, the MMSC can check whether prepaid customers have sufficient funds for services in their account. This interface has not been standardized yet. |
| MM10 | The MM10 interface allows interactions between the MMSC and a platform implementing a Messaging Service Control Function (MSCF). The MMSC requests the MSCF to execute some message-specific service logic that may influence addressing, routing and charging of multimedia messages; the MSCF can also access rights for users. This interface is in the process of being standardized, but no standard technical realization is available yet. |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 illustrates an embodiment of a system for implementing the invention. The system may include client 102, distribution sites 104 and 106, look-up server 108, and public traffic site 116. Client 102 may be or can include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. In an embodiment, client 102 may also be a server such as a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Distribution sites 104 and 106, look-up server 108, and public traffic site 116 may be or can include a server such as a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Look-up server 108 may be configured include a database that stores identifiers with corresponding references to locations of other distribution sites. In an embodiment, the database may store identifiers such as phone numbers of mobiles devices with references to corresponding locations of each mobile devices' designated distribution site. In such an embodiment, the reference of the location may be a domain name or URL of the mobile device's designated distribution site. In an embodiment, look-up server 108 may be an ENUM.

Distribution sites 104 and 106 may be utilized to push multimedia content to a plurality of mobile network carrier subscribers. In embodiments, there may be a multitude of distribution sites that are assigned to different mobile network carrier subscribers that are in different geographical locations. For example, a there could be a distribution site assigned to mobile network subscribers of a particular carrier for each state within the United States. However, the invention is not limited to such an example as any type of grouping of mobile network subscribers of certain carriers within geographical locations can be realized with the present invention. In an embodiment, distribution sites 104 and 106 may be MMSCs. Distribution sites 104 and 106 may additionally include messaging components 112 and 114 respectively. Messaging components 112 and 114 may be IP-based message delivery systems within the distribution sites that can allow users to view, edit, send, respond to, and receive multimedia messages which may include one or more objects of various types. In an embodiment, messaging components 112 and 114 may be IMPs. In an embodiment, distribution sites 104 and 106 may belong to the same carrier. In other embodiments, distribution sites 104 and 106 belong to different carriers.

Public traffic site 116 may be utilized to push multimedia data received from non-mobile network carrier subscribers to mobile network carrier subscribers. In an embodiment, public traffic site 116 may be a collection of one or more MMSCs. In an embodiment, public traffic site 116 may also include relay 118. Relay 118 may be utilized to communicate with an external server such as look-up server 108 through an interface.

Client 102, distribution sites 104 and 106, look-up server 108, and public traffic site 116 can each include a communication interface. The communication interface may be an interface that can allow each device to be directly connected to any other device or allows each device to be connected to another device over network 110. Network 110 can include, for example, a local area network (LAN), a wide area network (WAN), or the Internet. In an embodiment, a device can be connected to another device via a wireless interface.

Figure 2:
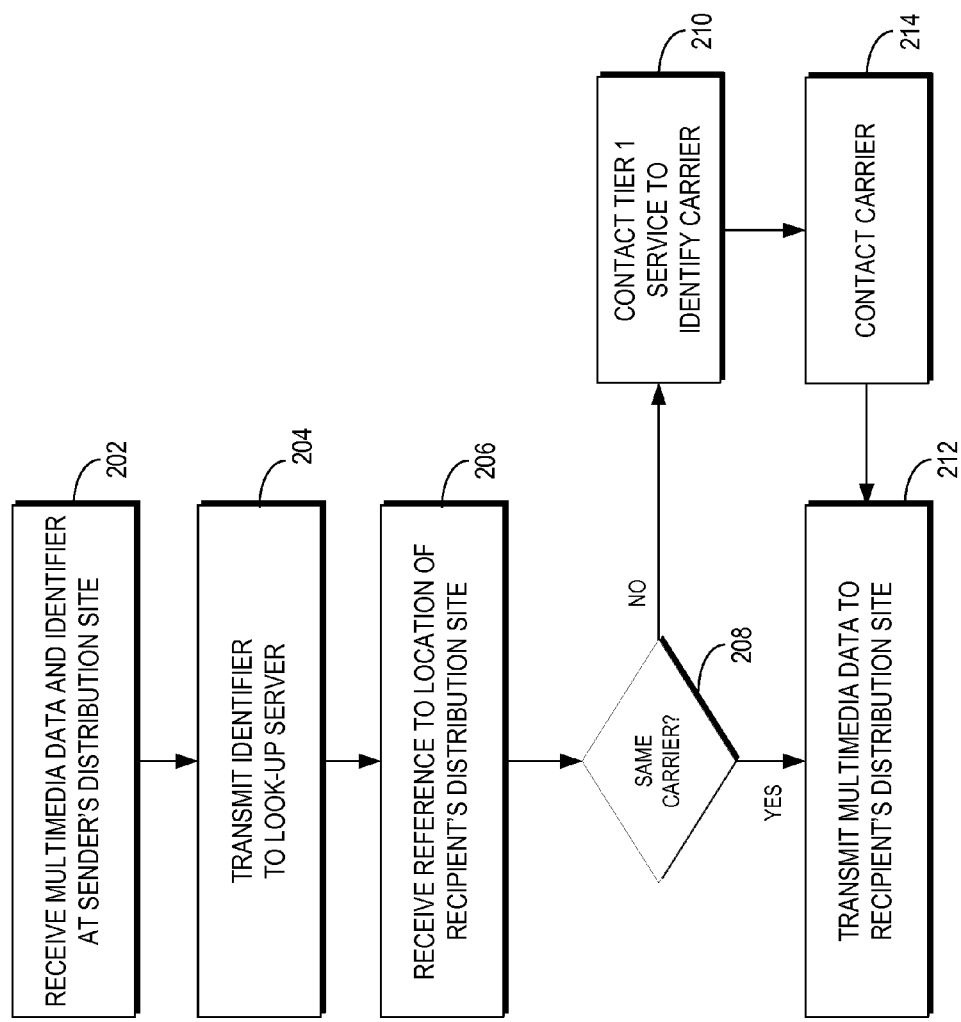
FIG. 2 illustrates an embodiment of a method for facilitating communication of multimedia data across a distributed network for a sender that is a carrier subscriber.

FIG. 2 illustrates an embodiment of a method for facilitating communication of multimedia data across a distributed network for a sender that is a carrier subscriber. In an embodiment, a carrier can be a mobile network service provider. In such an embodiment, different carriers may include, for example, Sprint, Verizon, Cingular, T-Mobile, etc. At operation 202, an item of multimedia data and an identifier are received at a sender's distribution site. The multimedia data and identifier may be received through a first interface. In an embodiment, the first interface may be a MM1 interface. Multimedia data may include any type of text, images, video, audio, or music content. In an embodiment, the identifier can be any type of reference to a recipient's client device. In an embodiment, the such a identifier can be the phone number of the recipient's mobile device.

At operation 204, the identifier may be transmitted to a look-up server. The sender's distribution site may communicate with the look-up server through a second interface. In an embodiment, the second interface may be a MM4 interface. In an embodiment, the look-up server may be an ENUM. Once the identifier is transmitted to the look-up server, the look-up server may search its database to determine the recipient's distribution site corresponding to the transmitted identifier. A reference to the location of the recipient's distribution site is transmitted from the look-up server, and at operation 206, the reference is received by the sender's distribution site. In an embodiment, the reference of the location may be a domain name or URL of the recipient's designated distribution site.

With the reference, the sender's distribution site can determine whether the recipient's distribution site belongs to the same carrier or a different carrier as the sender's distribution site. At operation 208, the sender's distribution site may use the reference to determine if the recipient's distribution site belongs to the same carrier as the sender's distribution site. If the sender's and recipient's distribution sites belong to the same carrier, then the sender's distribution site can use the reference to determine the location of the recipient's distribution site. Once the location has been determined, the sender's distribution site can contact the recipient's distribution site, and, at operation 212, may transmit the multimedia data to the recipient's distribution site. The multimedia data can be transmitted from the sender's distribution site to the recipient's distribution site through an interface. In an embodiment, such an interface may be a MM3 interface. Additionally, in another embodiment, the multimedia data may be transmitted using ESMTP. Once the multimedia data is received, the recipient's distribution site can then send the multimedia content to the recipient's client device.

If, however, the sender's and recipient's distribution sites do not belong to the same carrier, at operation 210, the sender's distribution site contacts a Tier-1 service in order to identify the carrier that corresponds to the reference. Once the Tier-1 service identifies the carrier, at operation 214, the sender's distribution site can contact the corresponding carrier. At operation 212, the sender's distribution site can transmit the multimedia data to the recipient's distribution site of the other carrier that corresponds to the reference. The multimedia data can be transmitted from the sender's distribution site to the recipient's distribution site through an interface. In an embodiment, such an interface may be a MM3 interface. Additionally, in another embodiment, the multimedia data may be transmitted using ESMTP. Once the multimedia data is received, the recipient's distribution site may then proceed to transmit the multimedia data to the recipient's client device.

Figure 3:
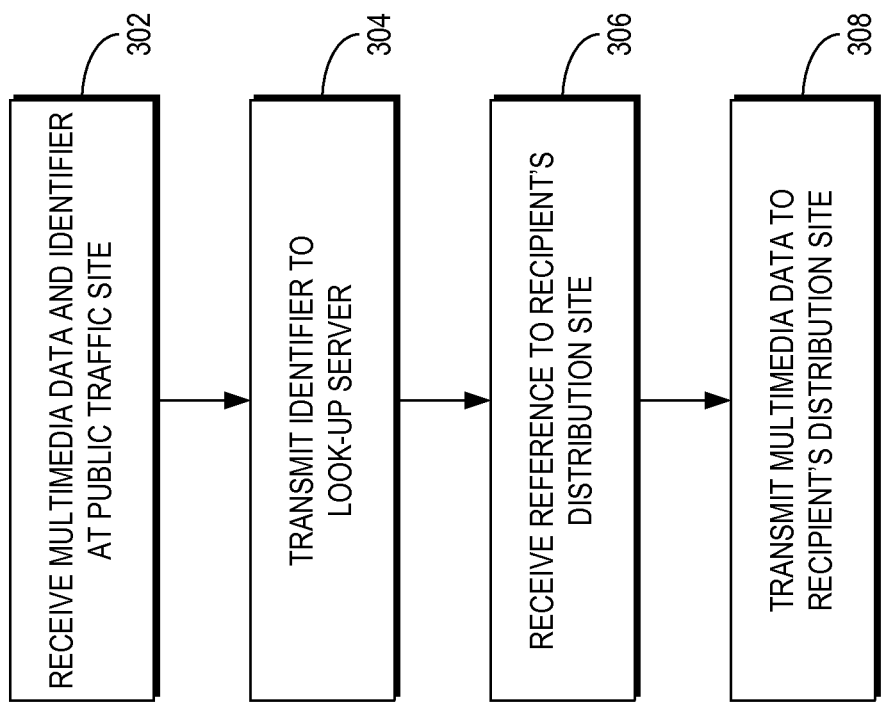
FIG. 3 illustrates an embodiment of a method for facilitating communication of multimedia data across a distributed network for a sender that is a non-carrier subscriber.

FIG. 3 illustrates an embodiment of a method for facilitating communication of multimedia data across a distributed network for a sender that is a non-carrier subscriber. A non-carrier subscriber sender can be any user of a client device who wishes to transmit multimedia data over a network, the Internet for example, wherein the sender's client device is not a part of a mobile network service provider. At operation 302, an item of multimedia data and an identifier is received at a public traffic site. In an embodiment, the identifier can be any type of reference to a recipient's client device. In an embodiment, the such a reference can be the phone number of the recipient's mobile device. At operation 304, the identifier is transmitted to a look-up server. In an embodiment, the look-up server may be an ENUM. The public traffic site may communicate with the look-up server through an interface. In an embodiment, the interface may be a MM4 interface.

Once the identifier is transmitted to the look-up server, the look-up server may search its database to determine the recipient's distribution site corresponding to the transmitted identifier. At operation 306, a reference to the location of the recipient's distribution site is received by the public traffic site from the look-up server. In an embodiment, the reference of the location may be a domain name or URL of the recipient's designated distribution site.

With the reference, the public traffic site can determine the recipient's designated distribution site. At operation 308, the public traffic site may transmit the multimedia data to the recipient's distribution site. The multimedia data can be transmitted from the public traffic site to the recipient's distribution site through an interface. In an embodiment, such an interface may be a MM3 interface. Additionally, in another embodiment, the multimedia data may be transmitted using ESMTP. Once the multimedia data is received, the recipient's distribution site can then send the multimedia content to the recipient's client device.

Figure 4:
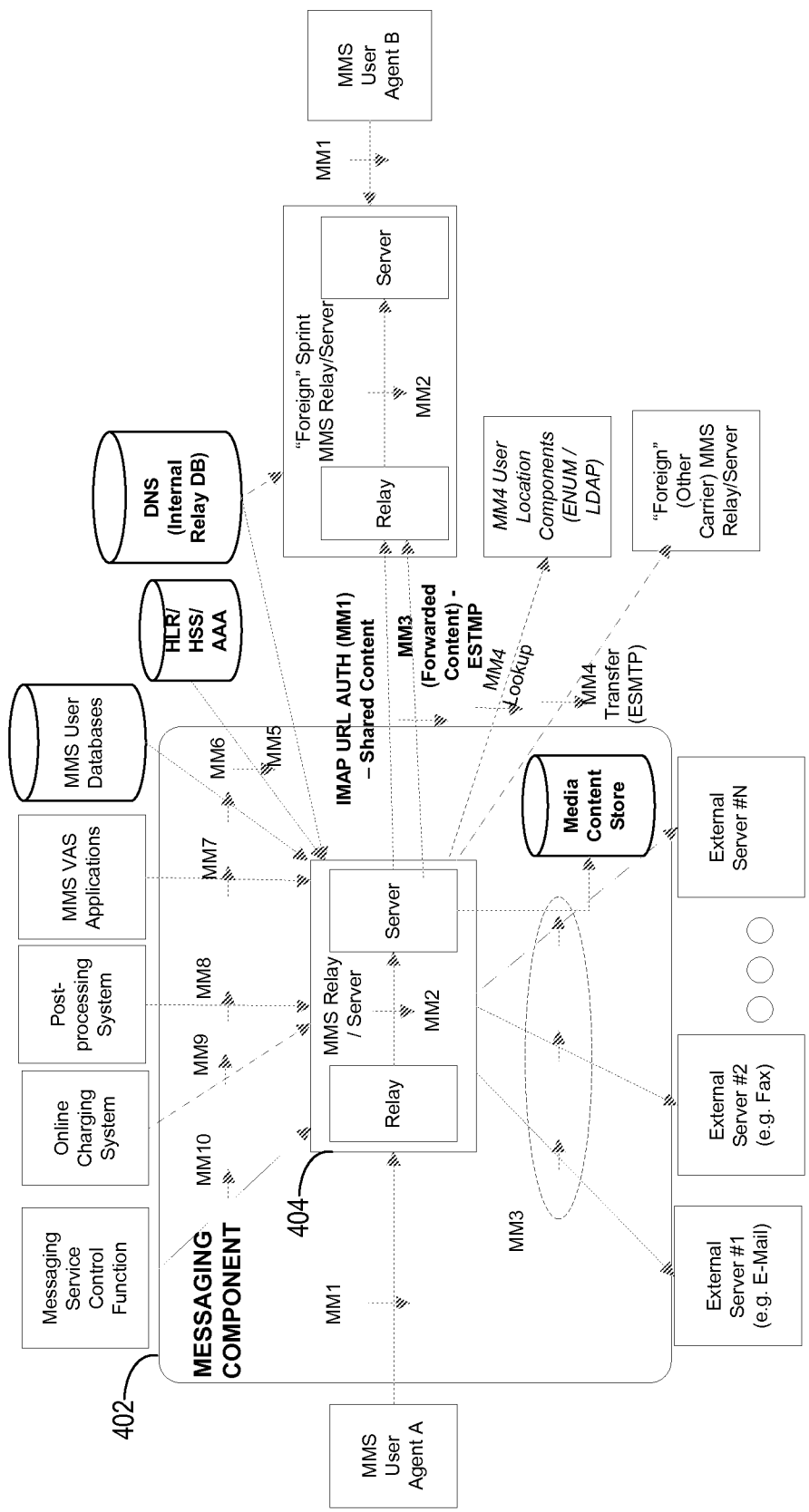
FIG. 4 illustrates an embodiment of a detailed representation of a messaging component.

FIG. 4 illustrates an embodiment of a detailed representation of a messaging component 402. Messaging component 402 may include a MMS relay/server component 404. In an embodiment, the relay may be configured to receive all the traffic sent to the messaging component 402. The relay can determine whether to forward the traffic or to store the traffic locally. FIG. 4 further illustrates an embodiment of how the messaging component communicates with various components through interfaces MM1-MM10 as defined above, wherein interfaces MM1-MM10 are a part of the 3GPP2 standard. Moreover, FIG. 4 illustrates that the invention can be configured to service any type of carrier provider or third-party server, for either intra or inter-carrier communication, using the MM3 and MM4 interfaces.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for facilitating communication of multimedia data across a distributed network, the method comprising:
receiving at least one item of multimedia data and an identifier at a public traffic site comprising a first communication interface, the identifier being associated with a recipient,
the public traffic site comprising a plurality of Multimedia Messaging Service Centers (MMSC) that form a geographically distributed multimedia processing platform in the distributed network, and
the at least one item of multimedia data and the identifier received at the first communication interface;
transmitting the identifier to a look-up server comprising a second communication interface;
receiving a reference to a location of a distribution site from the look-up server, the distribution site comprising a third communication interface and associated with the identifier of the recipient, wherein the reference is at least one of a domain name and a Universal Resource Locator (URL) of the distribution site; and determining whether the public traffic site and the distribution site associated with the recipient belong to a same carrier, wherein:

when the public traffic site belongs to the same carrier as the distribution site associated with the recipient, transmitting the at least one item of multimedia data to the distribution site by transmitting the at least one item of multimedia data from the first communication interface to the third communication interface using the same carrier, and when the public traffic site belongs to a different carrier than the distribution site, which is associated with a distribution site carrier, communicating with the look-up server to identify the distribution site carrier for the recipient, contacting the distribution site carrier, and transmitting, via the distribution site carrier, the at least one item of multimedia data to the distribution site, wherein the distribution site is configured to push the at least one item of multimedia data to the recipient.

2. The method of claim 1, wherein the recipient is a mobile device.

3. The method of claim 2, wherein the identifier is a phone number of the mobile device.

4. The method of claim 1, wherein at least one of the first, second, and third communication interfaces is an MM4 interface conforming to a version of the 3GPP2 standard.

5. The method of claim 1, wherein the distribution site transmits the at least one item of multimedia data to the recipient.

6. The method of claim 1, further comprising receiving the identifier from a foreign network carrier at the public traffic site, wherein the recipient is a subscriber of a home network carrier and the public traffic site is a system of the home network carrier.

7. The method of claim 1, wherein the distribution site is one of a plurality of distribution sites of a home network carrier, each of which is geographically associated with a respective one or more subscribers of the home network carrier.

* * * * *